US009354488B2

(12) United States Patent
Preston

(10) Patent No.: US 9,354,488 B2
(45) Date of Patent: *May 31, 2016

(54) METHODS, APPARATUSES, SYSTEMS AND SOFTWARE FOR FOCUSING A CAMERA

(71) Applicant: Howard Preston, Santa Monica, CA (US)

(72) Inventor: Howard Preston, Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/601,707

(22) Filed: Jan. 21, 2015

(65) Prior Publication Data

US 2015/0341542 A1    Nov. 26, 2015

Related U.S. Application Data

(63) Continuation of application No. 14/286,479, filed on May 23, 2014, now Pat. No. 8,982,272.

(51) Int. Cl.
| | | |
|---|---|---|
| G03B 13/00 | (2006.01) | |
| H04N 5/232 | (2006.01) | |
| G03B 13/20 | (2006.01) | |
| G03B 13/36 | (2006.01) | |

(52) U.S. Cl.
CPC ............. G03B 13/20 (2013.01); G03B 13/36 (2013.01); H04N 5/23212 (2013.01); H04N 5/23293 (2013.01)

(58) Field of Classification Search
CPC ... H04N 5/23212; G01S 17/89; G01S 17/486; G02B 7/32; G02B 7/28
USPC .............................. 348/345, 333.01, 348, 346
See application file for complete search history.

(56) References Cited

U.S. PATENT DOCUMENTS

| 4,458,992 A | 7/1984 | Preston |
|---|---|---|
| 4,862,046 A | 8/1989 | Preston |

(Continued)

FOREIGN PATENT DOCUMENTS

| EP | 1084437 A1 | 3/2001 |
|---|---|---|
| EP | 1549909 A1 | 7/2005 |

OTHER PUBLICATIONS

Extended European Search Report dated Jun. 23, 2015; European Patent Application No. 15152137.4; 13 pgs.; European Patent Office, Munich, Germany.

(Continued)

*Primary Examiner* — Antoinette Spinks
(74) *Attorney, Agent, or Firm* — Andrew D. Fortney; Central California IP Group, P.C.

(57) ABSTRACT

Methods, apparatuses, systems and software for focusing a camera are disclosed. The camera focusing system includes a distance measuring device, a video receiver that receives video/images, a graphics overlay unit, and a monitor. The distance measuring device includes an emitter that emits a radiation beam, a detector that detects reflected radiation, and logic that determines and processes distance information for subject(s) or object(s) in detection zones from the reflections. The graphics overlay unit receives video/image information from the video receiver and the distance information from the distance measuring device, and includes a video overlay and data processing unit that generates graphics indicating a field of detection and position for each detection zone and a direction and/or magnitude of a change in focus setting(s) to bring subjects or objects within each detection zone into focus. The monitor displays the video/image and the graphics overlaid thereon.

22 Claims, 8 Drawing Sheets

(56) References Cited

U.S. PATENT DOCUMENTS

| | | |
|---|---|---|
| 5,076,686 A | 12/1991 | Preston |
| 6,160,607 A | 12/2000 | Diaconu |
| 6,359,650 B1 | 3/2002 | Murakami |
| 7,342,650 B2 | 3/2008 | Kern et al. |
| 2002/0149689 A1 | 10/2002 | Sannoh et al. |
| 2006/0158423 A1 | 7/2006 | Kern et al. |
| 2006/0290932 A1 | 12/2006 | Kawanami |
| 2008/0284899 A1 | 11/2008 | Haubmann et al. |
| 2011/0199502 A1 | 8/2011 | Okamura |
| 2011/0292303 A1 | 12/2011 | Nimura et al. |
| 2012/0162375 A1 | 6/2012 | Vlutters et al. |

OTHER PUBLICATIONS

Partial European Search Report; European Patent Application No. EP 15 15 2137 dated Mar. 30, 2015; 7 pgs.

Bibliographic Data of EP1084437 (A1); Mar. 21, 2001; "Motion Picture Camera Focus Indicator Using the Parallax Geometry of Two Video Cameras"; Dan Mugur Diaconu; http://worldwide.espacenet.com.

Bibliographic Data of EP1549909 (A1); Jul. 6, 2005; "Electronic Display and Control Device for a Measuring Device"; Kern Gerhard, Klaus Schneider, Pius Vorburger and Juerg Hinderling; 2 pgs.; http://worldwide.espacenet.com.

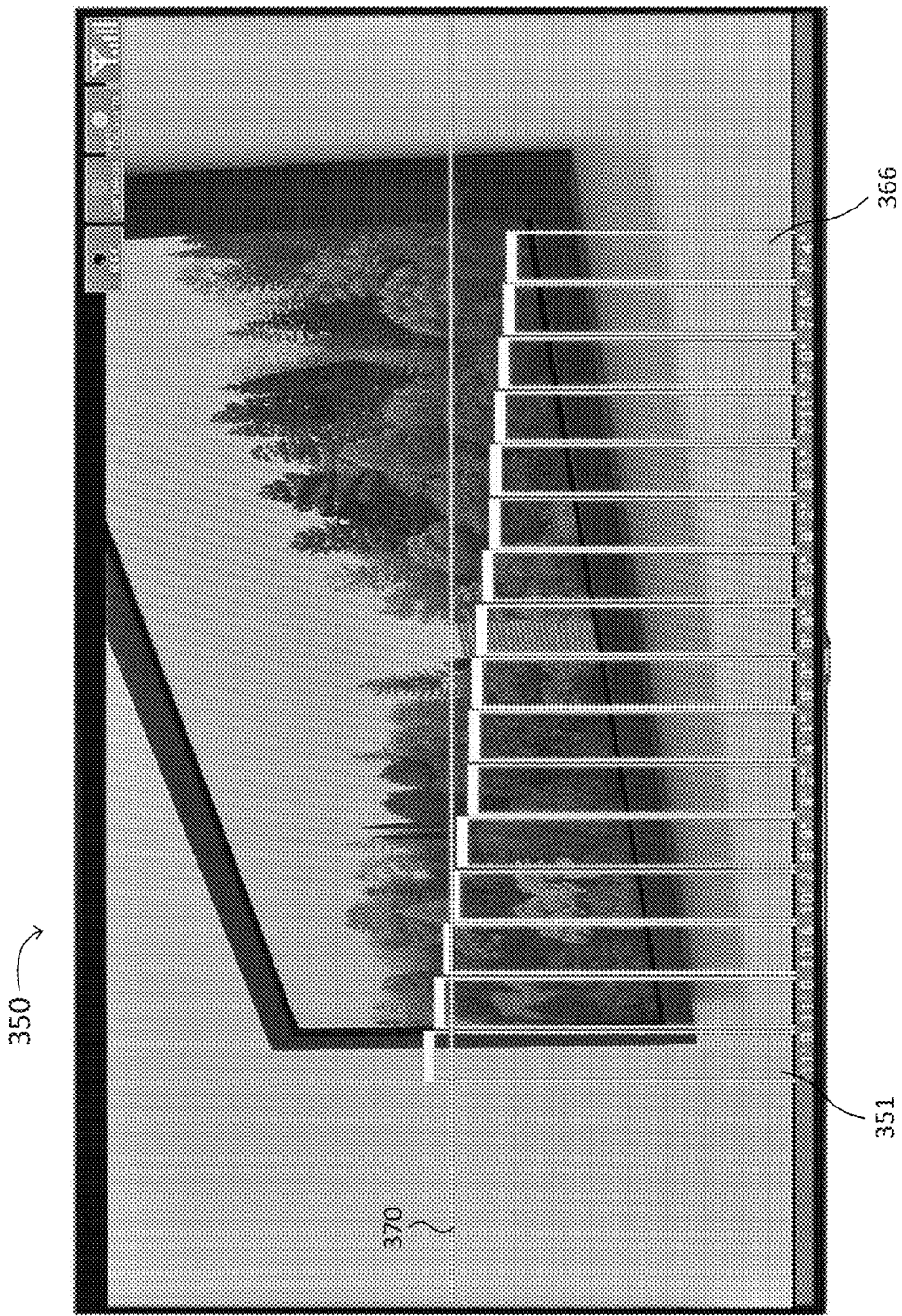

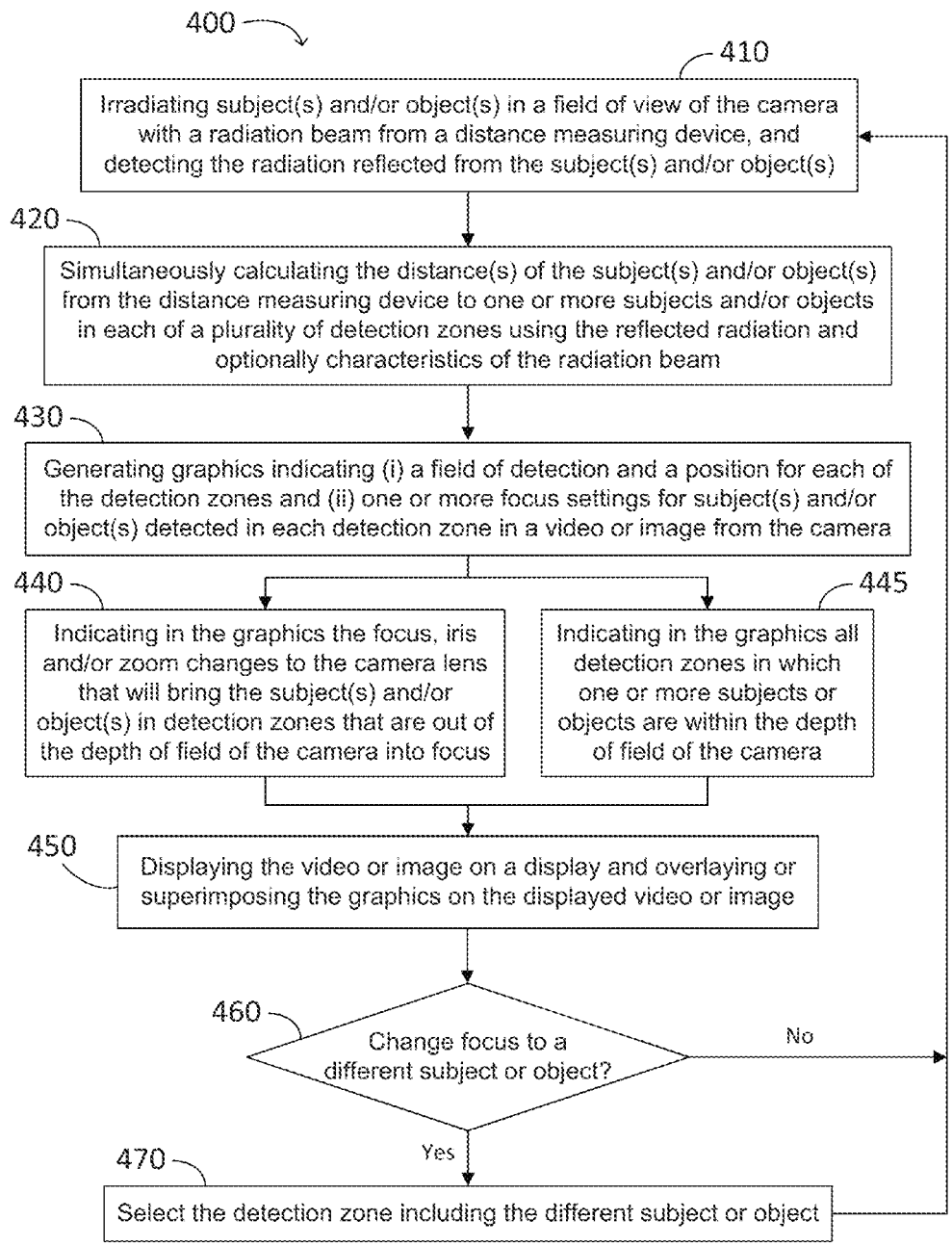

METHODS, APPARATUSES, SYSTEMS AND SOFTWARE FOR FOCUSING A CAMERA

RELATED APPLICATIONS

This application is a continuation of U.S. patent application Ser. No. 14/286,479, filed May 23, 2014, pending, which is incorporated herein by reference in its entirety.

FIELD OF THE INVENTION

The present invention generally relates to the field of focusing a motion picture or cinematic camera. More specifically, embodiments of the present invention pertain to methods, apparatuses, systems and software for focusing a motion picture camera.

DISCUSSION OF THE BACKGROUND

Conventionally, the focus of a motion picture camera lens is set manually to a distance where the plane of focus of the lens closely coincides with the location of a photographic subject. The camera lenses have focus distance calibrations that correspond to the distance from the image plane of the camera to the focus plane. Motion picture cameras may also have an electronic mechanism for delivering the focus distance setting through an electrical interface. The focus puller (e.g., a technician responsible for setting the focus of the camera lens) can adjust the camera lens to the subject distance by estimating the distance to a photographic subject and setting the focus distance of the lens to match the estimated distance, either directly or using electro-mechanical controls.

To estimate the focus setting for a static camera, the focus puller conventionally uses distance cues, such as reference marks made on the ground during rehearsal, or other objects whose known position relative to the camera can serve as distance references. Provided that the focus setting corresponds to the subject being within the depth of field of the lens, this depth being a specified range of distances in front of or behind the focus distance setting, the subject will appear acceptably sharp.

In many situations, the focus puller cannot achieve acceptably sharp focus using these conventional methods. For example, when the camera is moving during the process of shooting a scene, it is often not possible to use pre-set focus reference marks, as the path taken by the camera may not be predictable. In other situations, the depth of field of the lens is so shallow that the focus setting cannot be reliably estimated by the focus puller, even when reference marks are available.

In the situations described in the previous paragraph, the focus puller may use the image captured by the camera as displayed by a monitor to adjust the focus. However, the monitor can only show the degree to which the image appears to be in focus. If the image or subject is out of focus, the monitor cannot show the direction or the magnitude of any necessary focus setting change that will bring the subject coincident with the plane of focus, or within the depth of field of the lens.

There have been a number of challenges to focusing a camera (or image captured by the camera) using a video monitor. For example, once unclear or "buzzed" focus is observed, it is often too late to maintain or bring back focus, especially when subjects in the field of view of the camera are in motion. Sometimes it can be difficult to tell whether one must pull forward or backward to correct the focus. Peaking, or making the edges of objects within the image more visible (e.g., by increasing the contrast or color of the edges, or making the edges shimmer) does not provide much critical focusing information. Also, on many episodic TV series, there isn't sufficient room on set for the focus pullers, and they often work outside the set. On multiple camera shoots, there will be one monitor and one wireless focus unit for each camera and each assistant, thereby making demands for space for focus pullers even higher.

Distance measuring devices (DMD's) with single detection zones that are attached to the camera have been used both to autofocus the lens as well as to measure the distance between the camera and the subject. For example, U.S. Pat. No. 4,199,246 discloses an ultrasonic ranging system for autofocusing a camera. Subsequent ultrasonic DMD's have been attached to motion picture cameras to give focus pullers distance information for a single subject within the detection zone of the ultrasonic DMD.

The antenna pattern of an ultrasonic DMD includes a main lobe and attenuated side-lobes. Ultrasonic devices are most sensitive to targets within the main lobe. However, an off-axis target present in a side lobe may be detected and may cause incorrect focus. This characteristic can result in the ultrasonic DMD indicating erroneous distance especially if one or more targets are near the side-lobes. The single detection zone characteristic of ultrasonic DMD's limits the ability of the focus puller to discriminate between multiple targets located within the single detection zone of the ultrasonic DMD.

An additional disadvantage of devices that provide a digital display of the distance to a subject is that the user needs some time to interpret the difference between the distance display of the DMD and the present setting of the lens distance prior to changing the lens focus setting. The additional time that the user takes to interpret the digital information increases the difficulty of maintaining sharp focus in situations where the either the subject or camera is moving quickly.

Laser ranging (LR) devices have been attached to cameras for autofocus purposes as well as to provide distance measurements for manually focusing the camera lens. Such ranging devices detect targets within a small target detection area defined by the spot size of the collimated laser, and as a result, require precise targeting and tracking of the target. U.S. Pat. No. 8,363,152 B2 discloses such a device, where the alignment and tracking of the subject is carried out using a display device reproducing the shooting image, on which the object to be focused is selected, and the distance measurement instrument is aligned at the selected object and tracked.

Since LR devices typically have sensing beams with divergence angles much smaller than the typical horizontal or vertical angle of view of the camera lens, the operator of the device must precisely track the target. LR devices can measure and indicate the distance to a subject, and with appropriate correction for parallax, indicate the focus distance. Since the operator of the device is occupied with target tracking, the operator cannot manually alter the focus setting of the camera lens in accordance with the distance indicated by the LR device in a way that is consistent with the artistic intent of the scenario without difficulty. For this reason, LR devices may be well-suited for autofocusing, but disadvantageous for manual operation.

The disadvantage of auto-focus devices relative to manual focus control is that the rate at which the lens focus setting matches the subject distance is fixed by the settings of an automatic closed loop servo in auto-focus devices. Notwithstanding the possibility of providing a user with the facility to adjust the time response of the focus servo, the response must be preset in advance, precluding the matching of the time response to the movement of photographic subjects as it occurs. This disadvantage of autofocus devices is especially apparent when focus is changed between subjects. In such situations, the rate of change of the focus settings should be consistent with aesthetic considerations. More specifically, with reference to the movement of the subjects in certain contexts, settings or situations, a mechanical appearance to the focus change may be artistically undesirable.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to methods, apparatuses, systems and software for focusing a camera. The camera focusing system generally comprises (a) a distance measuring device, (b) a video receiver configured to receive video and/or images from the camera, (c) a graphics overlay unit, and (d) a monitor. The distance measuring device comprises an emitter configured to emit a beam of radiation, a detector configured to detect one or more reflections of the beam of radiation, and logic configured to determine and process distance information for one or more subjects or objects in each of a plurality of detection zones in a field of view of the camera from the reflections. The graphics overlay unit receives video and/or image information from the video receiver and the distance information from the distance measuring device, and comprises a video overlay and data processing unit configured to generate graphics indicating (1) a field of detection and position for each of the plurality of detection zones and (2) a direction and/or magnitude of a change in focus setting(s) for the subjects or objects within each detection zone not within a depth of field of the camera. The monitor displays the video and/or images from the camera and the graphics overlaid on the displayed video and/or image.

In some embodiments, the camera focusing system includes an array of detection zones along a horizontal axis across the field of view of the camera. Further embodiments include a two-dimensional array of detection zones (e.g., arranged in rows and columns). In other embodiments of the present camera focusing system, the graphics overlay unit further comprises a communication unit configured to receive information from a motor control, data processing, and communication unit on the camera that adjusts the focus, iris, and zoom settings and transmits lens setting data for the camera.

In some embodiments of the present camera focusing system, the graphics indicate (1) the direction and the magnitude of the change in the focus setting(s) that will achieve sharp focus on a subject or object in a selected detection zone, and (2) each detection zone containing the subjects or objects within the depth of field of the camera. In further embodiments, the graphics include a scaling that indicates the positions of the detection zones for changing a camera focal length and angle of view, and/or indicate a relative position of the subjects or objects within the depth of field of the camera.

The camera system generally comprises the present camera focusing system; a camera with a lens and a video transmitter unit that transmits a video or image signal output; a motor control and data processing unit configured to (i) adjust focus, iris, and zoom settings of the camera and (ii) transmit lens setting data to the video overlay and data processing unit; a video receiver configured to receive the video or image signal output; and a display device configured to display the video or image of the video or image signal output and the graphics overlaid on the video or image. In the present focusable camera system, the graphics generally include a horizontal array of detection zones. In one embodiment, the camera is a motion picture camera, and the motion picture camera may further comprise one or more motor and/or encoder units configured to (i) mechanically change settings of the lens according to signals from the motor control and data processing unit and (ii) communicate motor positions to the motor control and data processing unit. For example, the camera may include 3 motor and/or encoder units, configured to separately control the focus, iris and zoom settings or positions of the lens.

The present camera system may further comprise a data processor configured to (i) correct the distances measured by the distance measuring device for an offset from the distance measuring device to a predetermined location in an image plane of the camera and (ii) calculate the distances along an optical axis of the camera from the image plane to the subject(s) and/or object(s). In some embodiments, the data processor is further configured to calculate a lens focus setting for the subject(s) and/or object(s).

The method of focusing generally uses the present camera focusing system to focus the camera, and embodies one or more of the inventive concepts disclosed herein. The software generally creates graphics that are useful in the present method and camera focusing system.

The present invention overcomes disadvantages of autofocus devices by providing a mechanism for the user to manually adjust the focus on moving subjects with high accuracy, as well as providing an autofocus function in circumstances when manual adjustment may be challenging or impractical due to the motion of a subject or object being too fast or unpredictable. The present invention (and in particular, the overlaid graphics) make it possible for the user to switch between manual and autofocus modes smoothly. The present invention advantageously provides a method for the user to accurately focus the shooting lens of or on a motion picture camera by observing graphics overlaid on the image captured by the camera. The overlaid graphics can indicate both the direction and magnitude of distances, as measured along the optical axis of the camera lens, between the plane of focus of the camera lens and a plethora of subjects within a plurality of detection zones within the detection field of a distance measuring device.

In general, the elements in the systems include a motion picture camera, a distance measuring device, a lens readout device, a motor drive/data processing/communication unit, a display overlay and data processing device, and a video display device. The image may be captured or recorded in the camera on an electronic image sensor, photographic film, or other medium. The live image can be made available by the camera as an electrical signal that can be displayed on a monitor. The monitor may be integrated into the camera and/or be in a separate, stand-alone device. The distance measuring device measures distances and azimuth angles from its reference point to a plurality of targets. The lens readout device generates one or more signals indicating the focus distance setting, the f-stop, and in the case of a zoom lens, the focal length setting. The motor drive, data processing, and communication unit remotely adjusts the lens iris and the camera focus and zoom functions, and reports the lens settings (e.g., through a wireless link) to a remote processor and/or control unit. The display overlay and data processing device overlays graphics and text onto a live video stream (e.g., as captured by the camera). It can also calculate the lens depth of field, and encode the overlay graphics to reflect the direction and magnitude of the changes in lens focus settings to bring one or more subjects in the detection field into sharp focus.

The present invention advantageously provides a focusing device that allows a user to focus the lens of a motion picture camera on one or more subjects simultaneously by overlaying graphics on or over the image captured by the camera. The graphics indicate the direction and magnitude of the corrections to the present lens focus setting that will focus the camera on selected subjects in the image. The graphics can indicate the positions of the detection zones relative to the image captured by the camera. The graphics can also be scaled to indicate the positions of the detection zones for changing camera focal lengths and angles of view. The graphics can indicate which subjects are within the depth of field of the camera lens, the relative position of the subjects within the depth of field of the camera lens, which of the subjects are outside of the depth of field of the lens at its current focus setting, and the magnitude and direction of corrections in the focus settings that will place the subjects within the depth of field of the camera lens.

The present invention also advantageously provides a device or apparatus that comprises a measuring device that measures each of a plurality of distances from itself to each of a plurality of subjects in a field of view of a camera (e.g., within multiple detection zones in the field of view) simultaneously; a data processing device that can correct the distances measured by the distance measuring device for the offset from itself to the center of the camera image plane, and can calculate the distances along the optical axis of the camera lens from the image plane to the plurality of subjects, and thereby calculate the lens focus setting for each of the plurality of subjects; and a video overlay, data processing, and communication unit that generates graphics indicating the horizontal field of detection and position for each detection zone of and/or subject or object of interest in the detection field of the distance measuring device, and can determine and display the lens focus settings for the subjects detected in the detection field and/or each detection zone according to information provided by the data processing device.

The present device or apparatus may further comprise a motor control, data processing, and communication unit that adjusts the focus, iris, and zoom settings according to signals and/or information from and/or changes in user hand control units, and transmits lens setting data (e.g., through a wireless link) to the video overlay, data processing, and communication unit. In further embodiments, the present device or apparatus further comprises one or more motor encoder units configured to mechanically change the settings of the camera lens according to signals from the motor control, data processing and communication unit and communicate the motor positions to the motor control portion of the motor control, data processing, and communication unit. The present distance measuring device or apparatus may include a plurality of detection zones, and the detection zones can be arranged in a horizontal array. The present invention further relates to a motion picture camera having a lens, the camera including the present distance measuring device or apparatus, and a video signal output, a video transmitter unit, a video receiver, and a display device.

In some embodiments, the invention comprises software (e.g., a non-transitory computer-readable medium containing recorded or encoded instructions) which, when executed by a signal processing device configured to execute software, is configured to create or generate graphics to be overlaid onto a video or image, or perform part or all of the method(s) discussed above. These and other advantages of the present invention will become readily apparent from the detailed description of various embodiments below.

BRIEF DESCRIPTION OF THE DRAWINGS

FIG. 7 shows an exemplary image with distance measurements for all of the detection zones in a distance ranging mode of the invention.

FIG. 8 is a flow chart of an exemplary method of focusing a motion picture camera on one or more subjects within the detection zone(s) of the distance measuring device that are within the depth of field of the camera lens.

DETAILED DESCRIPTION

Figure 1:
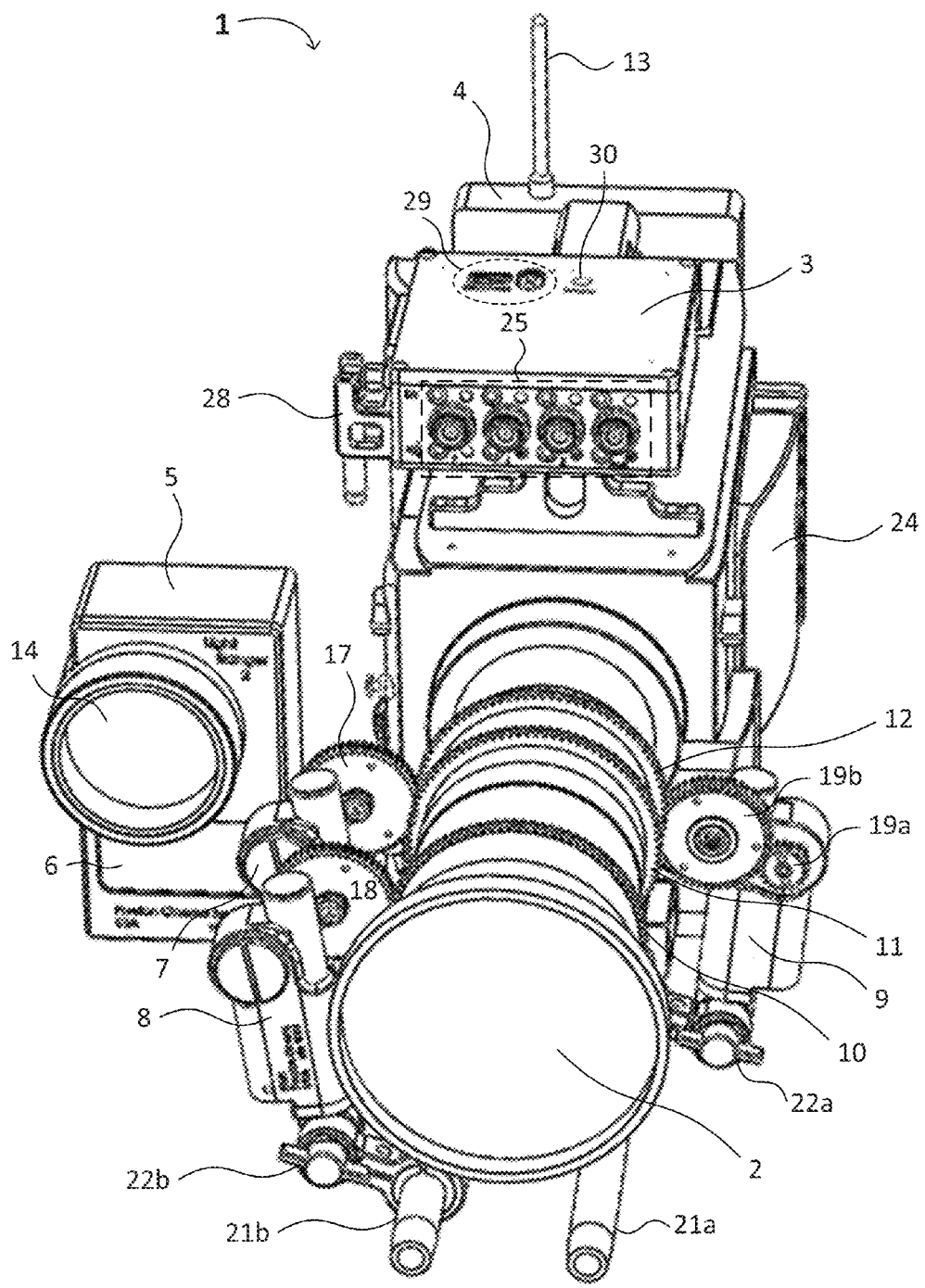
FIG. 1 is a representation of an exemplary motion picture camera including a distance measuring device, a wireless lens control unit, a lens focus control motor, and a wireless video transmitter.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The present invention provides an apparatus and method that can indicate simultaneously the focus status of multiple subjects in an image by a camera and shooting lens, where the focus status indications show both the direction and distance, as measured along the optical axis of the camera and lens, of the subjects from the plane of focus of the shooting lens. The focus status indications are shown in a display, and include graphical elements overlaid on the image captured by the camera. The graphical elements indicate the magnitude and direction of the change in lens focus setting(s) that will bring one or more of the subjects and/or objects in the field of view of the camera into sharp focus (e.g., a focus setting such that no further or additional detail can be gained in the desired or selected subjects and/or objects as captured by the camera by any further or additional change in the focus setting). The graphical elements overlaid on the display are much easier and/or faster for a user to interpret than conventional digital information displays. The invention thereby allows the user to simultaneously view the image captured by the camera, manually control the rate of change in the focus setting of the camera lens in accordance with the artistic requirements of the photography, and achieve high accuracy in focusing the lens on one or more subjects in the field of view of the camera.

The invention disclosed herein gives the user clear visual prompts in the form of graphics that show both the direction and magnitude that will bring the lens focus setting to the position of a particular subject in the field of view of the camera. The graphics shown on the display allow the user to concentrate on adjusting the focus settings in accordance with the movement of the photographic subjects, rather than estimating the focus distance to the subject. The present invention, by allowing accurate manual adjustment of focus, avoids any appearance of artificial and/or mechanical focusing that can result from the use of a fully automatic focus control system.

The invention concerns a distance measuring and/or focusing device that allows the user to focus the lens of a motion picture camera on one or more subjects simultaneously by overlaying graphics on or over the image captured by the camera, the graphics indicating the direction and/or magnitude of the corrections to the present lens focus setting that will achieve a sharp focus on selected subjects (e.g., within a selected detection zone). The graphics indicate the positions of the detection zones (and/or one or more objects in the detection zones) relative to the image captured by the camera. The graphics may also be scaled to indicate the positions of the detection zones for changing camera focal lengths and/or angles of view, indicate subjects that are within the depth of field of the camera lens or the relative position of the subjects within the depth of field of the camera lens, and/or indicate which of the subjects are outside of the depth of field of the lens at its current focus setting. In a further embodiment, the graphics can indicate or display the magnitude and/or direction of corrections in the focus settings that will place the subjects within the depth of field of the camera lens. The detection zones of the distance measuring device may be arranged in a horizontal array.

The invention also concerns a device (e.g., a focusable camera system) that comprises a distance measuring device that simultaneously measures the distance from itself to a plurality of subjects in multiple detection zones of the field of view of a camera; a data processing device that corrects the distances measured by the distance measuring device for the offset from itself to the center of the camera image plane, and that in a further embodiment, calculates the distances along the camera lens optical axis from the image plane to a plurality of subjects, thereby calculating the lens focus setting for the plurality of subjects; a video overlay, data processing, and communication unit that generates graphics that indicate the horizontal field of detection and the position of each detection zone of the distance measuring device, as well as one or more lens focus settings for the subjects detected within each detection zone; a motor control, data processing, and communication unit that adjusts the focus, iris, and zoom settings (e.g., according to user hand control units) and transmits lens setting data (e.g., through a wireless link) to the video overlay, data processing, and communication unit; one or more motor encoder units configured to mechanically change the settings of the camera lens according to one or more signals from the motor control, data processing and communication unit, and optionally, communicate the motor positions to the motor control unit; and a motion picture camera with a lens, the camera having a video signal output. The camera may further comprise a video transmitter unit, and the system may further comprise a video receiver (e.g., that receives the output of the video transmitter unit). In one embodiment, the video transmitter unit and the video receiver communicate wirelessly. The system also generally comprises a display device, which may be stand-alone or integrated with the camera or the distance measuring device, on which the graphics are displayed, and that the user (e.g., a focus puller) can view and interact with. In various embodiments, the detection zones of the distance measuring device are arranged in a horizontal array.

The invention, in its various aspects, will be explained in greater detail below with regard to exemplary embodiments.

An Exemplary Distance Measuring System and an Exemplary Camera System Including the Same Referring now to FIG. 1, the camera system as shown includes two units, a camera 1 and a sensor or distance measuring unit 5. The sensor or distance measuring unit 5 may be placed or fixed atop the camera 1, for example above the lens 2, or to a side of the camera 1 as shown in FIG. 1. Using parallax correction (which may be found in an on-screen menu; see the discussion below), the sensor or distance measuring unit 5 can be placed anywhere that is convenient for the user(s). A relatively quick setting can calibrate the offset (see the discussion herein).

As discussed herein, a motor control, data processing and communication unit MCDPU is attached to the camera 1, and one or more (e.g., a plurality of) electric motor/encoder units MEUs are coupled to the lens gear(s) or gear ring(s) of the camera to allow the lens focus setting (and optionally, the lens focal length and/or iris) to be controlled remotely by a remote manual control (hand) unit RMCU. The remote hand unit RMU in communication with the camera transmits both motor commands and lens calibration data to the MCDPU so that the MCDPU has at each moment the lens focus setting distance for each of a plurality of subjects and/or objects in the field of view of the camera. In one embodiment, the RMU communicates with the MCDPU via a wireless communication link.

The distance measuring device (DMD) 5 has a plurality of detection zones that may be arranged horizontally as a line array within its field of detection. The DMD is affixed to the camera and oriented so that (1) its line of sight is parallel to the line of sight of the camera, and (2) the horizontal axis of the camera sensor is parallel with the DMD field of detection (e.g., the detection zones). The DMD measures distances from its reference plane to subjects within its field of detection (e.g., in each of its multiple detection zones) simultaneously and provides data to the MCDPU on the distances, as well as the detection zones associated with the measurements when the DMD has plural detection zones. In some embodiments, the array of detection zones fills or substantially fills the field of view of the camera. Generally, the detection zones do not overlap, and in certain embodiments, the detection zones in the array are tiled (e.g., adjacent to each other in a one- or two-dimensional pattern). Each of the DMD detection zones may have an associated azimuth angle measured relative to the DMD line of sight so that the radial measurement of distance combined with the azimuth angle associated with the DMD detection zone define a vector whose component parallel to the optical axis of the camera is found by taking the product of the radial distance with the cosine of the azimuth angle.

In one implementation, distance detections performed by the DMD are resolved into angular increments approximately equal to the horizontal angle of detection of the DMD divided by the number of detection zones. The number of DMD detection zones and the horizontal angle of detection can be selected such that any error in the calculation of focus distance setting due to the finite size of the increments in azimuth angle is negligible for the specified range of operation and the desired or predetermined accuracy.

Figure 2B:
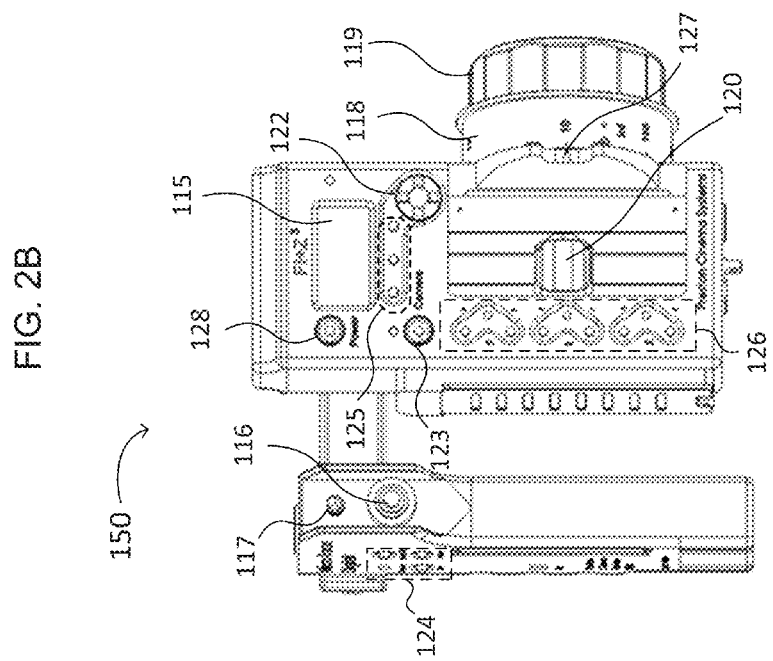
FIGS. 2A-B are representations of an exemplary wireless video processing unit including a graphics overlay unit (FIG. 2A), and an exemplary hand (manual) control unit (FIG. 2B).
Figure 2A:
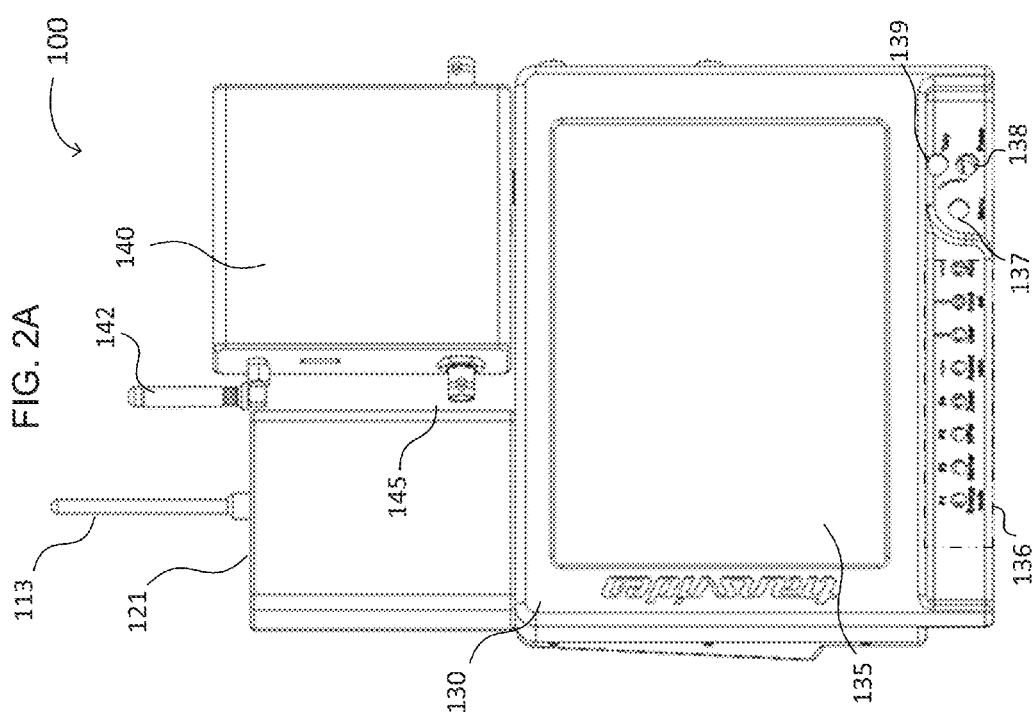

The camera system generally further includes two additional units, a video processing unit 100 and a hand control unit 150, exemplary embodiments of which are shown in FIGS. 2A-B. The video overlay and processing unit VOPU generates graphics to overlay onto the image captured by the camera. The graphics indicate, for each object in the field of view and/or detection zone of the DMD, the magnitude and the sign of the difference in distance between the subject or subjects in the field or in each zone, and optionally, the lens focus setting (henceforth, the "subject focus status"). A wide variety of graphical means can be utilized to encode the subject focus status, including but not limited to altering the color, brightness, or contrast of the underlying picture, overlaying graphic elements whose geometry varies, adding patterns of texture, and adding edge outlines to the images of subjects in the field of view or within DMD detection zones whose characteristics change with focus status. Additional data, including the lens focal length, T-stop setting, camera type, near and/or far depth of field distances, and/or image plane-to-subject distance measurements, can be displayed at the option of the manufacturer and/or user.

In one exemplary embodiment, the VOPU generates a graphical image including an array of horizontally arranged rectangular outlines, each of the outlines corresponding to a detection zone of the DMD within the field of view of the camera. The shape of the outlines can be substantially any regular geometric shape, such as circular, oval, square, hexagonal, octagonal, elongated hexagonal or octagonal, etc. The array of horizontally arranged outlines overlays the image captured by the camera with the graphics, and the resultant composite image is shown on a display. The width of each of the outlines appearing on the display corresponds to the horizontal angle of detection of the corresponding detection zone. Thus, the width of each of the outlines may be the same across the display, or may vary as a function of the distance of the outline from the center of the display or of the field of view of the camera. Different outlines distinguish between subjects that are within the depth of field of the camera lens, and objects that are outside the depth of field.

For subjects that are outside of the depth of field of the camera lens, in one embodiment, the outlines have one edge collinear to a median line extending horizontally across the display, and optionally, bisecting the height of the display. The focus status for subjects within each detection zone, but outside of the depth of field of the lens, is indicated by the height of the outline, which corresponds or is related to the difference between the focus setting distance and the distance from the subjects to the image plane of the camera.

In the present invention, the scale relating the height of the outlines to the difference in distance D between the subject in the outline and the plane of focus of the camera lens may be set by the user. In some embodiments, for subjects closer than the close limit of the lens depth of field, the minimum distance displayed from the median line of the display to the lowest display position is kD, where k is a number $0<k<1$, and for subjects farther than far limit of the lens depth of field the maximum distance displayed is D/k. If desired, these relationships can be reversed. The scaling may be customized (e.g., to user preferences) by choosing the value of k. For example, k may equal 0.5.

Outlines that correspond to subjects closer to the camera than the plane of focus, but outside of the lens depth of field, may extend from the median line downwards, while outlines that correspond to subjects farther from the camera than the plane of focus, but outside of the depth of field of the camera lens, may extend upwards from the median line. Alternatively, outlines that correspond to subjects closer to the camera than the plane of focus, but outside of the lens depth of field, may extend upwards from the median line, while outlines that correspond to subjects farther from the camera than the plane of focus, but outside of the depth of field of the camera lens, may extend downwards from the median line.

Whenever a subject within a detection zone is within the depth of field of the camera lens, the outline representing that zone on the display may change to a fixed height (e.g., from 25% to 50% of the height of the display, and in one example, approximately 33% of the height of the display) and/or be centered on the central horizontal axis of the array (e.g., the median line). Alternatively or additionally, the color of the outline may change to make its identification to the user immediately apparent. The outlines may move vertically so that the intersection of the median line along the vertical extent of the rectangle indicates the relative position of the subject within the lens depth of field (e.g., the median line may extend downwards when the subject is closer to the camera than the plane of focus and within the lens depth of field, and the median line may extend upwards when the subject is farther from the camera than the plane of focus and within the depth of field of the camera lens, or vice versa).

The VOPU may scale the graphics, indicate the DMD detection zones, and correct the position of the detection zones on the display so that the width and position of the outlines (e.g., rectangles) including the graphics accurately overlay the corresponding areas of the camera image. The lens angle of view is sent to the VOPU by a motor drive unit (e.g., through a wireless link). To accommodate variable focal length lenses, the focal length of which may change during the shooting of a scene, the angle of view information is transmitted with sufficient speed that the overlaid graphics smoothly follow change scales in the lens angle of view.

The VOPU calculates the parallax corrections that correctly position the overlay graphics using the two orthogonal components of the vector B (e.g., Bx along the horizontal axis of the camera image sensor, and Bz along the vertical axis of the image sensor of the DMD), known or determinable from the method and/or manner in which the DMD is fixed to the camera. In addition, to accommodate other mechanisms of fixing the DMD to the camera, the user may be given an option to enter horizontal and vertical offset values (e.g., through a set-up menu on the display). In some embodiments, the VOPU may generate additional graphics to indicate the vertical angle of view of the detection zones as corrected for parallax.

Since the display may be remote (e.g., a distance from the camera that may make the transmission of data by electrical cable from the DMD and/or the focus control unit to the VOPU inconvenient), one exemplary embodiment of the invention uses a wireless link for the transmission of such data. Also, a wireless link (e.g., the same or different wireless link) may be used to transmit the video signal from the camera to the DVPI.

Although laser distance ranging devices of a type that perform measurements within a single detection zone have been used to autofocus camera lenses, their fully automatic operation may result in the focus changes having a mechanical appearance. This mechanical appearance results from the autofocus control loop effecting focus changes at a fixed rate, independent of artistic requirements. Nonetheless, there may be situations in which an auto-focus capability is advantageous (e.g., documentary or journalism filming, in which subjects may act in an unexpected or unpredictable manner), and the present invention also encompasses motion picture cameras and focusing mechanisms and apparatuses that include an auto-focus function.

FIG. 1 shows an exemplary camera 1, including a zoom objective lens 2, motor control, data processing and communication unit MCDPU 3, a video transmitter unit 4, a distance measuring device (DMD) 5, and a digital video camera 24. The objective lens 2 includes a plurality of lens gears or gear rings 10-12, configured to adjust or change the focus, iris and zoom settings of the lens 2. The camera 1 includes a plurality of motors and/or encoders 7-9, configured to drive the lens gears or gear rings 10-12 using gears 17, 18 and 19a-b. The video transmitter unit 4 includes an antenna 13 configured to broadcast a video signal captured by the camera 1.

The motor control, data processing and communication unit MCDPU 3 includes a plurality of receptacles 25 for transmitting electrical signals to the motors and/or encoders 7-9 (e.g., using wires or cables), one or more switches 29 for selecting the wireless communication channel for the MCDPU 3, one or more corresponding displays or indicators 30 (e.g., indicating the communication channel for the MCDPU 3, or that the MCDPU 3 is on or off), and an antenna 28 for wirelessly transmitting signals to the motors and/or encoders 7-9 and/or receiving wireless signals from a video overlay and data processing unit (FIG. 2A). The MCDPU 3 also includes circuitry and/or logic configured to convert the signals and/or information from the video overlay and data processing unit into signals that cause one or more of the motors and/or encoders 7-9 to change or adjust a corresponding focus, iris and/or zoom gear ring to a desired or predetermined setting.

The DMD 5 comprises an emitter 6 configured to emit a radiation beam, a reflected beam detector 14, and circuitry and/or logic configured to determine or calculate a distance for each of a plurality of subjects and/or objects in the field of view of the camera 1 from the emitted beam and the reflected beam. In one embodiment, the emitter 6 comprises a light-emitting diode (LED) that emits infrared (IR) light. The radiation beam emitted by the emitter may have a fan shape and/or a characteristic spreading angle (e.g., of from 5° to 45°, from 10° to 30°, or any other angle or range of angles within the range 5-45°). The IR light may comprise broadband IR light, to improve the uniformity of the response of the reflected light across a broad range of subject and object types. Alternatively, the IR light may comprise narrow band IR light, which may reduce costs and/or facilitate manufacturing and/or operations of the system.

The motion picture camera 1 shown in FIG. 1 captures images from a zoom objective lens 2. The focus, iris, and zoom functions of the objective lens 2 are adjusted by the focus lens gear 10, the zoom lens gear 11, and the iris lens gear 12. The gear 18 of motor/encoder 8 is coupled to the focus gear 10, the gears 19a-b of motor/encoder 9 are coupled to the zoom gear 11, and the gear 17 of motor/encoder 7 is coupled to the iris gear 12. Motor/encoders 7-9 are controlled by the motor control data processing and communication unit MCDPU 3. The video transmitter unit 4 sends the image captured by camera 1 wirelessly via the antenna 13 to a video receiver 121 (see FIG. 2A).

FIG. 2A shows an exemplary video processing unit 100, including a video receiver 121 equipped with an antenna 113, a graphics overlay unit 140 equipped with an antenna 142 and a connector 145 configured to receive the video signal from the video receiver 121, and a monitor 130 having a display screen 135. The monitor 130 may further comprise a control block/interface 136 (including a plurality of controls for changing or adjusting the energy mode [e.g., battery-powered operation or plugged in], marker, WFM, zoom, aspect ratio, selecting the user and/or input source, and/or making other adjustment[s]), a menu display on/off button 137, a power on/off button 138, and a tally indicator 139 that indicates whether the selected camera/input source is recording or not. In addition to displaying the video and/or image with the present graphics overlaid thereon, the monitor 130 can also display lens data in a predetermined region of the display 135 (e.g., in a separate bar at the bottom of the screen). The lens data may include one or more of the following: focus distance, the iris setting(s), the focal length of the lens, and endpoints of the depth of field range (i.e., the depth of field near distance and the depth of field far distance).

FIG. 2B shows an exemplary hand control unit 150, including a digital display 115 for use in calibrating the camera and using the focus, iris and zoom motor controls, camera start/stop indicators 117 and 123, a control interface 124 (for calibrating the lens, such as the zoom function/settings), a zoom controller 116, a focus knob 119, an iris control slider 120, a switch 122 for selecting menu items on the display 115, soft input keys 125 for selecting certain displayed items or functions on the display 115, a ring selector 118 for selecting a focus distance, a witness mark 127 that indicates the focus distance selected using the ring selector 118, a focus knob 119, and a set of limit selection keys 126 configured to allow the user to select limits for the focus, iris and/or zoom motors (e.g., motors 7-9 in FIG. 1). The zoom controller 116 may comprise a pressure-sensitive joystick, in which the pressure applied to the joystick controls the rate or speed with which the camera changes the focus, iris and/or zoom.

The video graphics overlay and (data) processing unit VOPU 140 can be attached electrically (and optionally, mechanically) to the monitor 130. The video overlay unit 140 receives focus information from both the DMD 5 and the hand control unit 150 (FIG. 2B). A beam of radiation (e.g., infrared light) from the DMD emitter 6 reflects or bounces off objects in the scene (e.g., the field of view of the camera). The angle of the radiation may be from 5° to 45° (in one example, it is about 18°), and its range can be up to about 300 meters or 1000 feet (in one example, it is about 50 meters or 150 feet). The reflected beam is captured by a detector array behind the lens 14 of the distance measuring unit 5. In general, the detector array corresponds to the array of detection zones to be generated by the VOPU 140. For example, the detector array may comprise a single row of from 4 to 64 detectors (e.g., 16 detectors), or a two-dimensional array of x rows of detectors by y columns of detectors, where x and y are each integers of at least 2 (e.g., $2 \leq x \leq 8$; $4 \leq y \leq 64$). The detector array may comprise an array of image detectors integrated onto a single substrate or as discrete devices. Consequently, the present distance measuring device or unit can avoid the use of narrowly collimated lasers (thereby eliminating consequent eye safety issues) and ultrasonic signals, and transponders need not be attached to the actors or other moving subjects in the field of view of the camera.

Referring back to FIG. 1, MCDPU 3 positions the gears of motors and/or encoders 7, 8, and 9 in accordance with the motor position information and/or data sent by controls 115 and 117 (shown in FIG. 2). Rotation of the focus knob 119 controls the position of the gear of motor/encoder 8, linear motion of the iris knob 120 controls the position of the gear of motor/encoder 7, and pressure on the zoom control knob 116 controls the position of the gear of motor/encoder 9. The focus, iris, and zoom settings of the lens may be referred to herein as lens settings. The lens settings are transmitted by user hand control unit 150 via a wireless link (e.g., including antenna 113) to the MCDPU 3 (FIG. 1) in the form of serial digital data. The lens settings may also be sent directly to the MCDPU 3 by lenses that provide their lens data through an electrical interface (not shown).

Distance measuring device DMD 5 is generally a fixed and/or known distance from the focal plane 220 of the camera 1. The line of sight of the DMD 5 is parallel to that of the camera lens optical axis (e.g., OA1; see FIG. 3), and the displacement of the central detection area 210 of the DMD 5 from the center of the camera focal plane 220 is shown in terms of the x and y components (and alternatively, of the x, y and z components) of the vectors A and B in FIG. 3. The MCDPU 3 (FIG. 1) receives distance data from DMD 5, and transmits both the distance data and the current focus distance setting that the MCDPU 3 receives from the user control 115 (FIG. 2) to the video overlay and processing unit VOPU 140.

Figure 3:
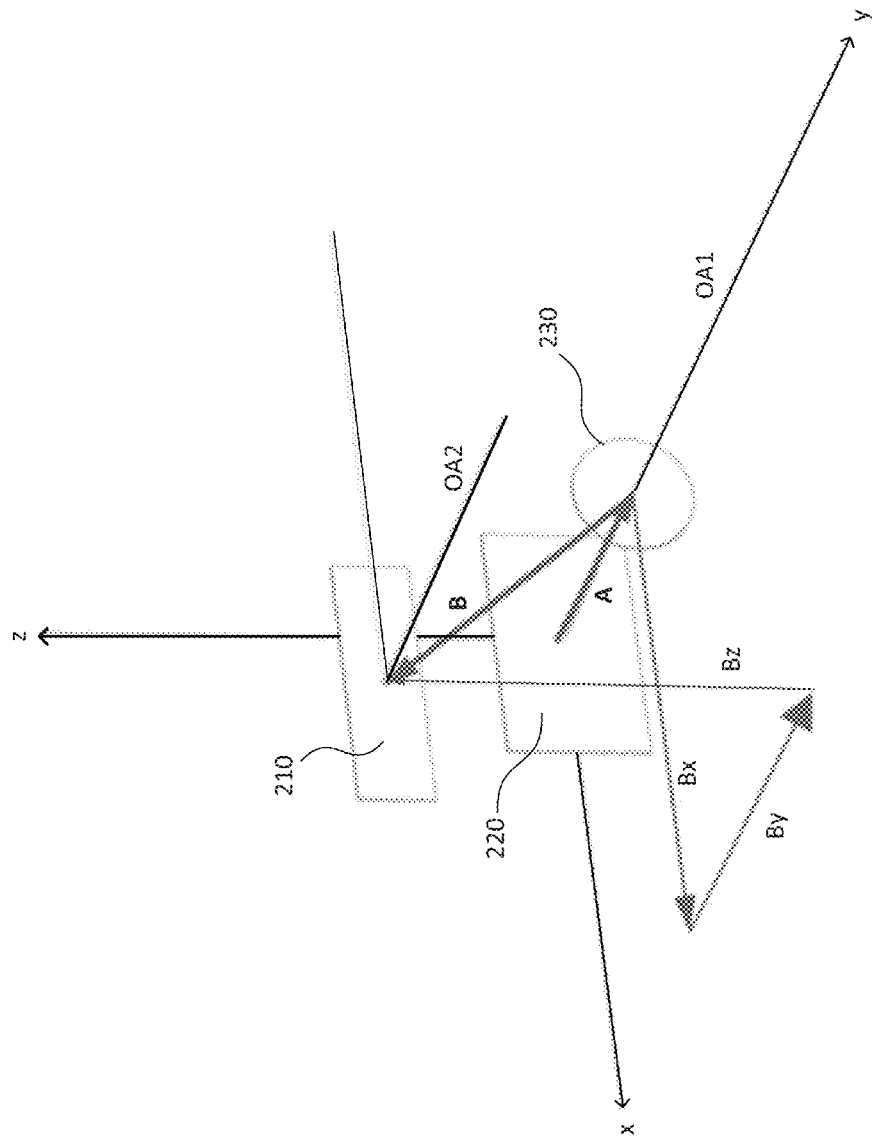
FIG. 3 shows a graphical representation for determining the distances separating the camera sensor of the camera, the sensor of the distance measuring device, and the entry pupil of the camera lens.

Exemplary Methods of Determining a Camera-to-Subject Distance and Correcting for the Camera-to-Distance Measuring Device Offset FIG. 3 shows the geometric and spatial relationships between the reference plane 210 of the distance measuring device, the image plane 220 of the camera, and the eye pupil 230 of the camera lens. The reference plane 210 is the array of sensors in the distance measuring device that detect reflected radiation. The relationships shown in FIG. 3 are useful for determining the offset of the distance measuring device from the image plane 220 of the camera.

Figure 4:
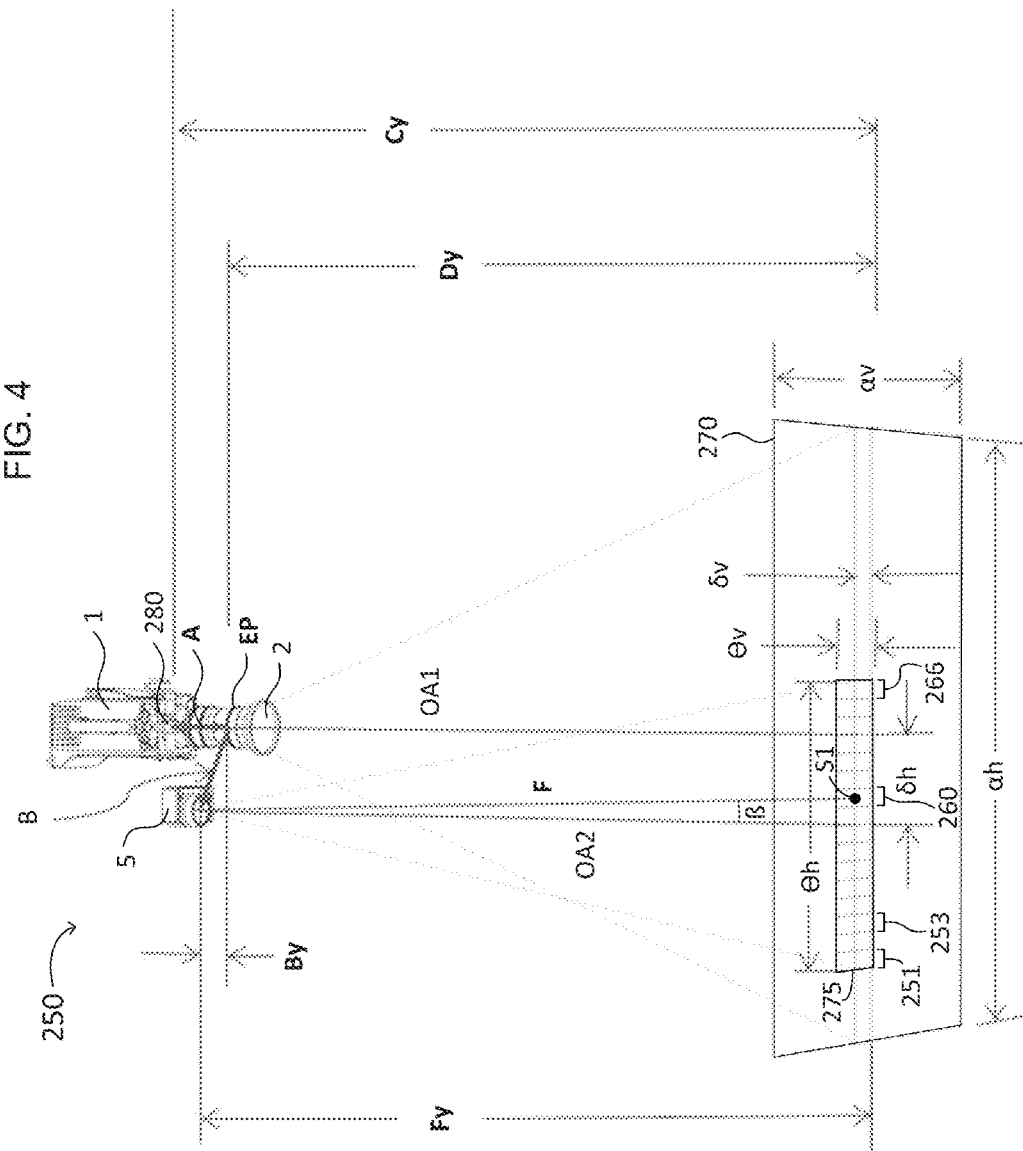
FIG. 4 is a graphical representation showing exemplary horizontal and vertical angles of view of the motion picture camera, and exemplary horizontal and vertical angles of detection of the distance measuring device, for determining the distance of an object from the image plane of the motion picture camera.

FIG. 4 shows exemplary relative positions of the camera 1, lens 2, DMD 5, the horizontal angle or width αh of the object plane 270 (the plane on which the lens is focused) at the distance of the subject S1, and the horizontal angle or width θh of the intersection 275 of the horizontal angle view of the DMD 5 detection array with the object plane 270. FIG. 4 also shows the difference or offset δh between the optical axis OA1 of the camera 1 and the optical axis OA2 of the DMD 5. Although the DMD 5 can simultaneously measure multiple subjects in all of the detection zones 251-266, for the sake of clarity, a single subject S1 (e.g., a calibration subject) is shown in the DMD detection zone 260 at the azimuth angle β.

Because the camera image plane is not coincident with the DMD reference plane, and the camera lens optical axis is not coincident with the DMD optical axis, the VOPU calculates the subject-to-image plane distance by correcting the distances measured by the DMD 5 (see, e.g., FIG. 4) to account for the separation between the DMD 5 and the camera image plane (e.g., 220 in FIG. 3). Since lenses used in the cinema or motion picture arts generally have substantially flat planes of focus, and lens focus distance calibrations are referenced from the camera image plane (e.g., 220 in FIG. 3) along the camera lens optical axis OA1 to the plane of focus, for each of the subjects detected by the DMD 5, the VOPU calculates the distance Cy (the camera image plane-to-subject distance; see FIG. 4) along the optical axis of the camera OA1 from the image plane of the camera (e.g., 220) to the intersection S1 of the optical axis with the plane of focus 270 for the subject (e.g., a calibration subject). Cy is calculated by adding or summing a vector A, directed from the image plane 220 of the camera (FIG. 3) to the entrance pupil EP (FIG. 4) of the lens 230 (FIG. 3), a vector B, directed from the entrance pupil EP (FIG. 4) of the lens 230 (FIG. 3) to the intersection point of the DMD reference plane 210 and the DMD optical axis OA2 (henceforth referred to as the center of the DMD reference plane), and a vector F (FIG. 4), directed from the center of the DMD reference plane 210 (FIG. 3) to the subject (e.g., S1; FIG. 4); and calculating the component of the resultant vector that is parallel to the optical axis OA1 of the DMD 5. The vector A (FIG. 3) may lie along an optical axis OA1, in which case its component along the optical axis is |A|, its absolute value. By (FIGS. 3-4), the component of vector B along an axis parallel to axis OA1, may be calculated or determined by calibration. Fy, the component of the vector F (FIG. 4) directed along an optical axis OA2 of the DMD 5 (FIGS. 3-4), may be calculated or determined by multiplying the distance |F| measured from the center of the DMD 5 to the subject by the cosine of the angle β (FIG. 4) subtending vector F and the axis OA2.

According to the foregoing, Cy is the following sum: $|A|+By+|F|\cos \beta$. The first two terms are distances that are found, calculated or determined in a calibration step, in which the user places a target at a distance Ey along the optical axis OA2 of the DMD 5, and adjusts the focus of the lens to maximize the sharpness of the target (e.g., as shown on the display). The DMD 5 measures |Fc|, the distance from the DMD 5 to the target, as well as the angle βc (e.g., the azimuth angle of the calibration target). The distance from the camera image plane 280 (FIG. 4) along the camera optical axis OA1 to the calibration target S1 (FIG. 4) is $Cy=|A|+By+|Fc|\cos \beta c$. In such an example, the distances |A| and By are defined by the equation: $|A|+By=Cc-|Fc|\cos \beta c$, where Cc is the known distance (e.g., from lens calibration) from the lens to the target (e.g., along optical axis OA1). Using the aforesaid calibration data, the VOPU calculates Cy according to the equation: $Cy=Cc-|Fc|\cos \beta c+|F| \cos \beta$.

FIG. 4 shows the DMD 5 in a preferred embodiment with 16 detection zones 251-266 arranged in a horizontal array. However, the DMD 5 may have any plural number of detection zones (e.g., at least 4, from 4 to 256 or any range therein, such as from 4 to 64, etc.). The array 251-266 has a horizontal angle or width of detection θh and a vertical angle or height of detection θv. The camera 1 has a horizontal angle of or width view αh at the focal distance of the subject S1 and a vertical angle or height of view αv. The angle or distance δv represents the height from the bottom of the intersection 275 of the DMD vertical angle of detection with the object plane 270 to the horizontal axis of the detection zones 251-266 as displayed in the graphics to be overlaid on the video/image. The vector B, the parallax offset between the entrance pupil EP of the camera lens 2 and the DMD 5, is directed from the entrance pupil EP of camera lens 2 to the center of the DMD 5 image detector. The optical axis OA1 of the camera 1 is parallel to the optical axis OA2 of the DMD 5.

Referring now to FIG. 3, Bx, the x component of the vector B, results in a horizontal shift of the center of the array of graphic elements (representing the detection zones 251-266) with respect to the center of the image captured by the camera 1 and shown on display 135 (FIG. 2) by an amount w*δh/αh, where w is the horizontal dimension of the active area of the display 13, and $\alpha h=\tan^{-1}(Bx/Dy)$. In the example shown in FIG. 4, the graphic elements comprise rectangular elements or outlines. Bz, the z component of the vector B, results in a vertical shift of the center of the array of graphic elements by the amount v*δv/αv, where v is the vertical dimension of the active area of the display 135, and αv=tan$^{-1}$(Bz/Dy).

The VOPU 114 shown in FIG. 2 uses the known components of the vector A and Cy (the known focus distance of the camera, as measured from the image plane 280 of the camera; see FIG. 4) to shift the position of the overlay graphics in both the horizontal and vertical directions so that the outlines (e.g., rectangles 301-316 in FIG. 5) constituting the overlay graphics are positioned over the corresponding areas of the image captured by camera 1 and shown in the display 113. The VOPU 114 generates graphics indicating the focus status of subjects within the plurality of detection zones 251-266 of DMD 5 and overlays the focus status graphics onto the camera image received by the wireless video receiver 121 (FIG. 2A).

The VOPU 114 calculates the y-component of the distances from the plurality of subjects within the detection zones 251-266 of the DMD 5 to the camera image plane 220 (FIG. 3) by summing the y-components of the distance of each subject detected by the DMD 5 with the y-component of the vector B, the known displacement of the DMD 5 relative to the camera image plane 220. Since the DMD 5 has a small vertical angle of view, and the z-component of the vector B is assumed or presumed to be small relative to the minimum usable subject-to-image plane distance, the vectors directed from the sensor 210 of the DMD 5 to any of the plethora of subjects in the field of view of the camera 1 are assumed to lie in the x-y plane, and their y-components are determined or calculated by multiplying their distances by the cosine of the azimuth angle for the center of the corresponding detection zone 251 through 266.

Exemplary Graphics Overlaid on an Image

Figure 5:
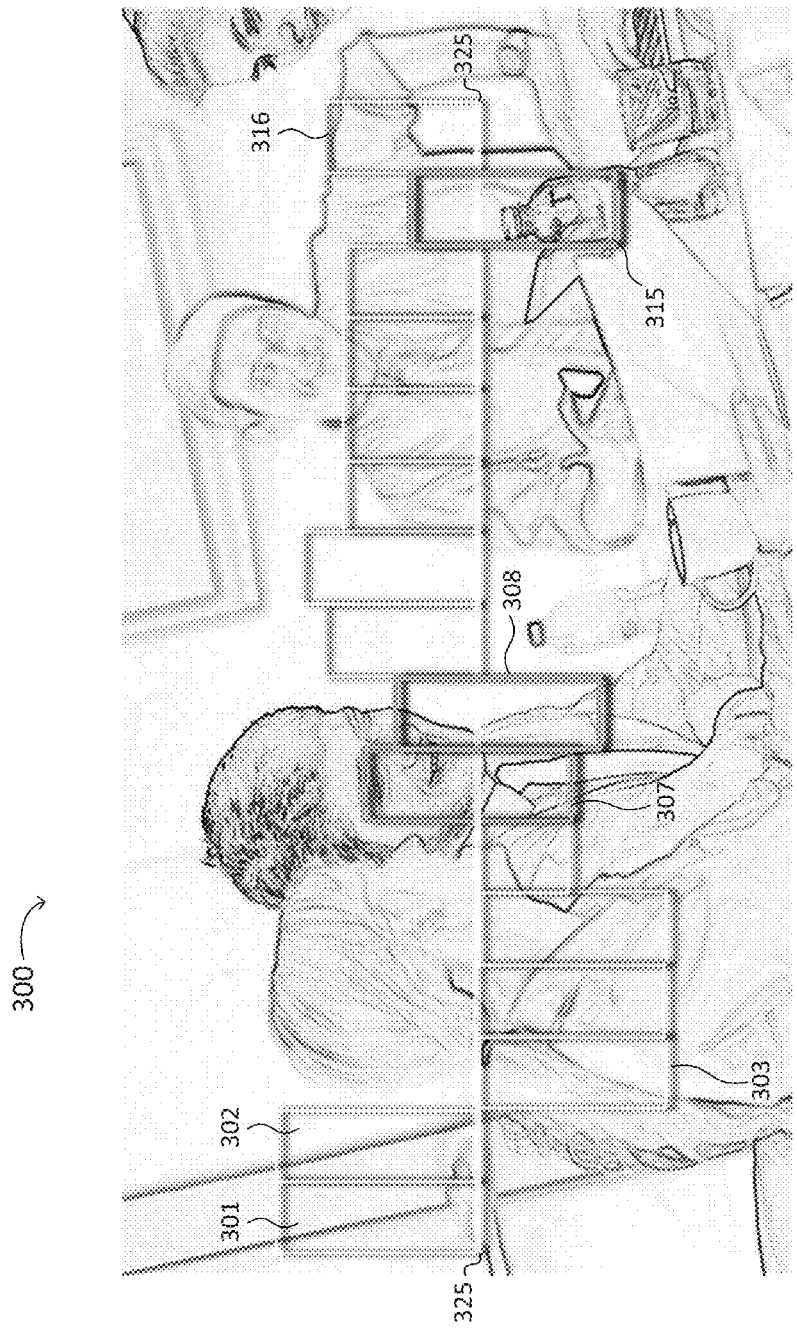
FIG. 5 is an exemplary representation of an image captured by the motion picture camera overlaid by graphics to show the user the direction and magnitude of the change in focus lens setting that will place one or more of the subjects within the horizontal and vertical fields of detection of the distance measuring device within the depth of field of the camera lens.

FIG. 5 shows a representation of an image 300 captured by the camera 1 and with graphics overlaid by the VOPU. The horizontal median line 325 spans the image 300 from the left edge of the first detection zone 301 to the right edge of the last detection zone 316, and is the reference from which the heights of the detection zone shapes (e.g., rectangles) are measured. The rectangles in the exemplary embodiment of FIG. 5 are open so that the underlying camera image can be clearly seen. The heights of the rectangles from the median line 325 indicate the magnitude and direction of the difference between the focus setting of the camera lens 2 and the distance from the subject(s) in each detection zone 301-316 of the DMD 5 to the image plane 220 of the camera 1. The width of each of the rectangles occupies the same horizontal angle of view in the composite image 300 as the horizontal angle of view divided by the number of detection zones represented by each of the DMD detection zones 301-316. For example, the height of rectangle 302 above the median line 325 indicates that the distance within the enclosed detection zone 302 is greater than both the lens setting distance Cy and the far limit of the lens depth of field Cy+δy$^{far}$. The height of the rectangle 303 below the median line 325 indicates that the distance measured within the enclosed detection zone 303 is less than either the lens setting Cy or the near limit of the lens depth of field Cy−δy$^{near}$.

The sides of rectangles 307, 308 and 315 are colored to indicate that the distance measured within the enclosed detection zones 307, 308 and 315 is within the depth of field of the lens. The depth of field of the lens is calculated using the known settings for lens f-stop, lens focal length, and focus distance. An advantage of the present graphics is that it becomes intuitive to pull focus, because the graphics can show the direction and/or magnitude to turn the knob or adjust another control of a wireless hand camera unit to bring objects into sharp focus.

In the example shown in FIG. 5, the overlaid graphics include 16 focus/detection zones 301-316. The array may have an appearance similar to that of a bar graph. Each zone may have, for example, a white bar at the top or bottom, the height of which indicates the distance and direction that a subject (e.g., the main subject) in the zone is from the plane of focus of the camera. The zone color may change (e.g., from white to green) when a subject in the zone is within the lens depth of field. Zone or white bars above the median line 325 are behind the plane of focus of the camera. Zones or white bars below the median line 325 are in front of the plane of focus of the camera. Green bars or rectangles show zones that are in focus, and thus automatically show the depth of field, calculated by lens focal length, distance and T-Stop. The graphics overlaid on the image 300 (e.g., shown on a monitor such as monitor 135 in FIG. 2A) thus show the distance and the direction the subject is from the plane of focus. The user does not need to compare lens focus setting(s) to distance measurement(s).

Exemplary Additional Embodiments

In cases where the movement of subjects is too rapid to follow manually, an autofocus function is advantageous. Thus, in further embodiments, the present focusing system and camera further include auto-focus (AF) capability. For example, the present line sensor detector (e.g., DMD 5, FIGS. 1 and 4) may further include control circuitry, motor(s), and software/programming enabling the camera lens to automatically focus on a selected object in a given detection zone. The focusing system, detector and/or camera may further include a switch that turns the auto-focus function on and off.

In the auto-focus mode (e.g., the switch turns the auto-focus function on), the positions of the detection zones may be shown by a horizontal array of rectangles and/or other shapes. The zone or group of zones selected by the user using a switch, touchscreen, pull-down menu or other user selection or entry mechanism is displayed or indicated on the graphics overlaying the camera image. For example, selection of a particular zone or zones may be shown by changing the graphics (e.g., by changing the color of the selected rectangle).

Figure 6:
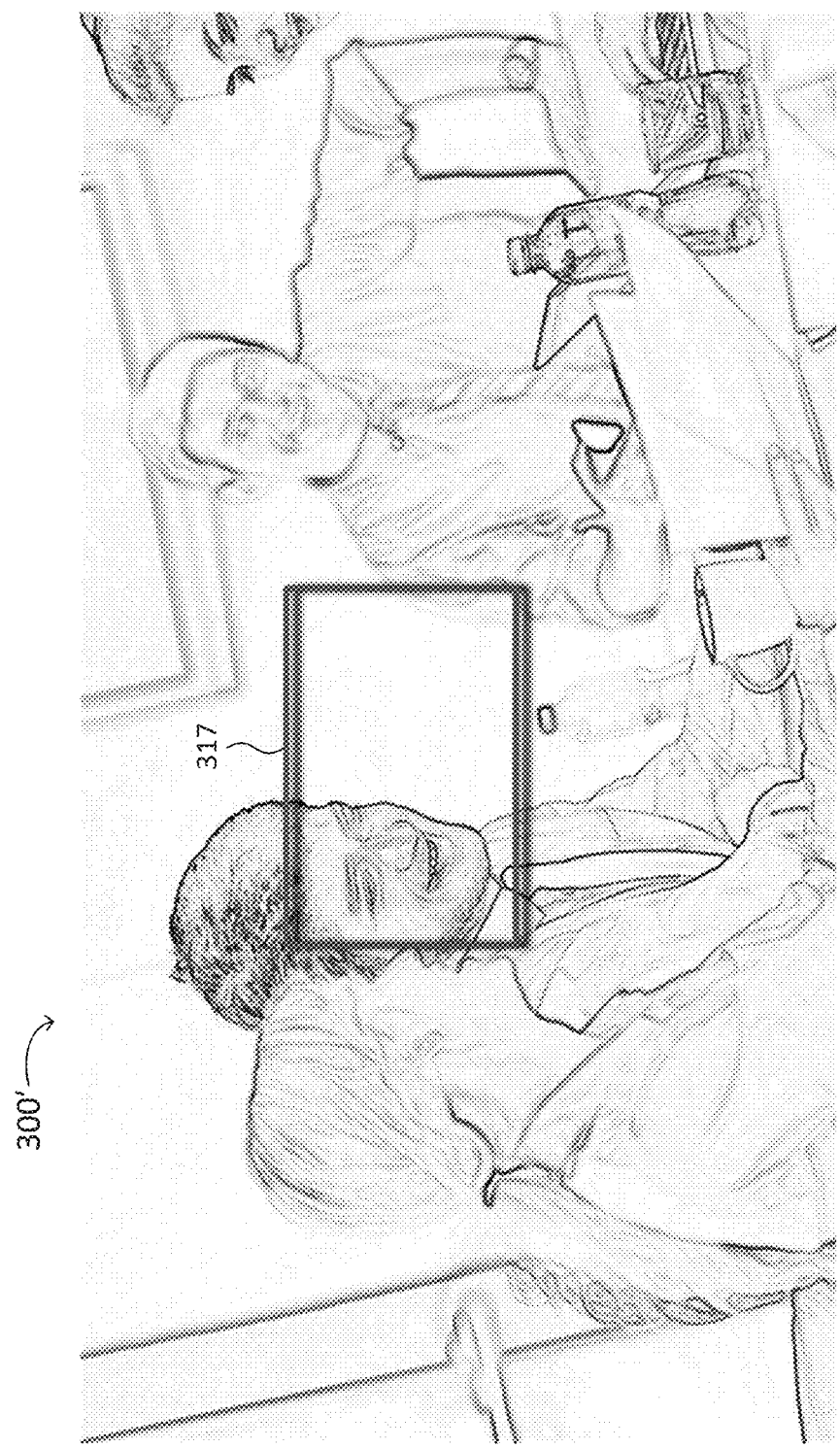
FIG. 6 is an exemplary representation of an image captured by the motion picture camera overlaid by a graphic in accordance with an auto-focus mode of the invention.

In one embodiment, as shown in FIG. 6, when the user selects the auto-focus function, the array of detection zones is replaced by a single auto-focus detection zone overlaid on the video or image, outlining the area of a group of detection zones (e.g., a center group of detection zones) from the array. In the auto-focus mode, the lens focus is set on the closest subject or object (e.g., the shortest distance measurement) in one or more of the user-selected detection zones. For example, when x detection zones are arranged in a horizontal array (where x is an integer of at least 4) in the manual focusing mode, from 25% to 50% of the detection zones of the array are replaced (e.g., automatically or by user selection) in the auto-focus mode with an auto-focus detection zone. For example, from x/4 to x/2 of the x detection zones in the center of the array may be replaced with an auto-focus detection zone, although some embodiments may allow for more than one auto-focus detection zone. In one implementation, a horizontal array of sixteen rectangles (see FIG. 5), the six center detection zones (rectangles) are replaced by a single rectangle 317 (FIG. 7) over the video or image 300'.

In one variation, the video processing unit (e.g., 100 in FIG. 2A) allows the user to select the number of detection zones and their position real-time (e.g., "on the fly"). Alternatively or additionally, the user can make auto-focus selections (e.g., for configuration of the auto-focus detection zone) via user controls on the hand control unit (e.g., 150 in FIG. 2B). Further variations allow the user to select the speed with which focus changes are made, the relative position of the subject/object on which to measure distance and/or autofocus (e.g., nearest, farthest, in the center of the detection zone, etc.), etc.

In one embodiment, the auto-focus mode is entered by selecting an appropriately labeled menu item displayed on the hand control unit display 115 (e.g., pressing a soft input key 129 [FIG. 2B] below an item labeled "Auto-focus"). Upon entering the auto-focus mode, the lens may focus on the closest subject in the auto-focus detection zone 317 (FIG. 6), which may be a center portion of the detection zones in the array displayed in the manual focus mode, as described herein. As shown in FIG. 6, a red rectangle 317 overlays the image 300' on the monitor (e.g., 135 in FIG. 2A) to outline the autofocus detection zone. To return from the autofocus mode to the manual focus mode, the user simply presses the autofocus mode selection soft key 129 again. Alternatively, in one embodiment, the user can set the focus knob 119 (FIG. 2B) to match the focus distance shown on the monitor 135 (FIG. 2A). In one example, both the focus distance measurement and the focus knob setting are shown on the monitor 135. When the user presses the autofocus mode selection soft key 129 again, the system returns to manual focus mode without a focus jump.

Further embodiments of the present invention may include or employ multi-line and/or two-dimensional (2D) detection and/or sensing, either manually or in combination with the autofocus function described herein. A multi-line or 2D sensor can provide focus information for subjects not covered by the vertical angle of view of the line detection sensor (e.g., DMD 5). The operator can choose which detection line is active using a switch or a touch screen function on the video monitor. The bar graph display is centered on the overlaid image as described with regard to the present line detection sensor, but one or more horizontal lines are added to indicate the vertical limits of the selected detection zones. For example, a pair of horizontal lines can be added to the display, one above and one below a center line (e.g., the horizontal line of the line detection sensor described above).

The multi-line/2D detection sensor can also be equipped with an autofocus (AF) operation. In one embodiment, the display has a 2D array of rectangles or other shapes overlaid on the image from the camera to indicate the detection zones. The user can then choose which of the overlaid rectangles or shapes in which the AF distance is measured using a joystick, mouse, a touch screen function on the video monitor, or other selection mechanism. In a further embodiment, an autofocus tracking mode can use motion estimation to automatically select which detection zone provides the desired autofocus distance data.

In one further embodiment shown in FIG. 7, a relatively simple distance ranging mode shows distance measurements for all of the detection zones 351-366 on an image 350 simultaneously when distance and/or focus information is to be obtained quickly, or (for example) when a user cannot run a focus tape. In such an embodiment, the predetermined region 370 of the display for showing lens data may instead display the distance of the subject or object in each of the detection zones 351-366.

An Exemplary Method

The present invention further relates to method of focusing a camera, comprising simultaneously determining a distance from a distance measuring device to one or more subjects and/or objects in each of a plurality of detection zones of the distance measuring device; generating graphics indicating (i) a field of detection and a position for each of the detection zones and (ii) one or more focus settings for subject(s) and/or object(s) detected in each detection zone in a video or image from the camera; indicating in the graphics focus changes, adjustments or corrections to a lens of the camera that will bring the subject(s) and/or object(s) in detection zones that are out of the depth of field of the camera into focus; and displaying the video or image on a display, and overlaying or superimposing the graphics on the displayed video or image. In a further embodiment, the graphics further indicate a detection zone in which one or more subjects or objects are within the depth of field of the camera.

In further embodiments, the method further comprises (i) changing or adjusting the focus of the lens to bring into focus the subject(s) and/or object(s) in one or more detection zones that are out of the depth of field of the camera (e.g., not in focus), and/or (ii) irradiating the subject(s) or object(s) in a field of view of the camera with radiation, detecting radiation reflected from the subject(s) or object(s), and calculating the distance(s) from the reflected radiation to determine the distance(s) of the subject(s) or object(s) in each of the detection zones.

FIG. 8 shows an exemplary method 400 of focusing a camera. In one embodiment, the camera is a motion picture camera, and the method focuses the camera on one or more subjects or objects in a plurality of detection zones in a video. In a first step, one or more subject(s) and/or object(s) in a field of view of the camera are irradiated with a radiation beam from a distance measuring device at 410, and the radiation reflected from the subject(s) and/or object(s) is detected, as described herein. For example, to minimize (i) the risk of damage or injury to the subject(s) and/or object(s) and (ii) the potential disruption to filming or recording the video, the radiation may consist of infrared (IR) light. Prior to irradiating the subject(s) and/or object(s) and detecting the reflected radiation, the distance measuring device may be attached above and/or adjacent to the camera's lens. The emitter of the distance measuring device is aimed in the same direction as the optical axis of the lens. In various embodiments, the distance measuring device has a threaded coupling mechanism thereon for mounting to a matte box bar, standard camera accessory mount or coupling device (e.g., a Schulz Quickfix accessory mount), or Noga style arm. Power (e.g., 10-30 V DC from a battery or an AC-DC converter) may be supplied to the distance measuring device through a power port (e.g., a 2-pin power connector). In one embodiment, the distance measuring device can transmit and receive electrical signals to and from a motor control, data processing and communication unit of the camera through a serial port and/or connection (e.g., a USB cable or wire) on each device/unit.

At 420, the distance(s) of the subject(s) and/or object(s) in each of a plurality of detection zones are simultaneously calculated from the distance measuring device using the reflected radiation, in a manner known to those skilled in the art and corrected as explained above. Optionally, the distance(s) of the subject(s) and/or object(s) from the distance measuring device are calculated using characteristics (e.g., the wavelength[s], intensity, etc.) of the radiation beam.

At 430, graphics are generated that indicate (i) a field of detection and a position for each of the detection zones and (ii) one or more focus settings for subject(s) and/or object(s) detected in each detection zone in a video or image from the camera. The graphics also indicate at 440 the focus changes to the camera lens that will bring the subject(s) and/or object(s) in detection zones that are out of the depth of field of the camera into focus. In many embodiments, the graphics also indicate all of the detection zones in which one or more subjects or objects are within the depth of field of the camera (e.g., that are in focus) at 445. Lens setting data, in the form of overlaid text accompanying the graphics, can indicate in addition to the lens setting(s) the near and far limits of the depth of field.

Prior to generating the graphics, the graphics overlay unit can be attached to the back of, or connected inline with, a viewing monitor. Generally, there are at least three connections to the graphics overlay unit: power, video input and video output. Each of the video input and video output may comprise an HD-SDI or HDMI standard connection, and be carried over a BNC cable, among others. Parallax correction of the position of the distance measuring device relative to the camera lens can be determined, calculated and/or controlled using a graphics overlay menu (e.g., commands and inputs displayed, entered and/or selected on the monitor).

At 450, the video or image is displayed on a display (e.g., a monitor or screen), and the graphics are overlaid or superimposed on the displayed video or image. The graphics may comprise a horizontal array of detection zones (e.g., zones 251-266 in FIG. 5, in sequence along a horizontal axis), or a two-dimensional array of zones (e.g., arranged as x rows and y columns, where x and y are integers of at least 2, as described herein). The graphics indicate (i) a field of detection and a position for each of the detection zones, (ii) one or more focus settings for the subject(s) and/or object(s) in the video or image that are detected in each detection zone, and (iii) the focus changes or adjustments (and optionally, the iris and/or zoom changes or adjustments) to the camera lens that will bring into focus those subject(s) and/or object(s) in detection zones that are out of the depth of field of the camera. The graphics may also indicate those detection zones, if any, in which one or more subjects or objects are within the depth of field of the camera (e.g., that are in focus).

At 460, it is determined whether to change focus to a different subject or object. If not, the method 400 simply continuously irradiates the subject(s) and/or object(s) in the field of view with the radiation beam, detects the radiation reflected from the subject(s) and/or object(s), and calculates the distance(s) of the subject(s) and/or object(s) in each of the detection zones from the distance measuring device. If so, the detection zone including the different subject or object is selected, then the focus (and optionally, the iris and/or zoom) settings or position of the lens is changed or adjusted to bring the subject(s) and/or object(s) in the selected detection zone into focus. Because filming and/or video recording is a continuous process, the subject(s) and/or object(s) in the field of view of the camera are continuously irradiated, the reflected radiation continuously detected, and the distance(s) of the subject(s) and/or object(s) in each of the detection zones from the distance measuring device continuously calculated (and any changes in the direction or magnitude of the changes needed to bring onto focus subjects and/or objects that are not in focus are updated in the graphics) as described herein.

Exemplary Software

The present disclosure also includes algorithms, computer program(s), computer-readable media and/or software, implementable and/or executable in a general purpose computer or workstation equipped with a conventional digital signal processor, and configured to perform one or more of the methods and/or one or more operations of the hardware disclosed herein. Thus, a further aspect of the invention relates to algorithms and/or software that create or generate graphics that indicate a focus state for one or more subjects and/or objects in each of a plurality of detection zones of a distance measuring device, and/or that implement part or all of any method disclosed herein. For example, the computer program or computer-readable medium generally contains a set of instructions which, when executed by an appropriate processing device (e.g., a signal processing device, such as a microcontroller, microprocessor or DSP device), is configured to perform the above-described method(s), operation(s), and/or algorithm(s).

The computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code. The code is generally digital, and is generally configured for processing by a conventional digital data processor (e.g., a microprocessor, microcontroller, or logic circuit such as a programmable gate array, programmable logic circuit/device or application-specific integrated circuit [ASIC]).

Thus, an aspect of the present invention relates to a non-transitory computer-readable medium, comprising a set of instructions encoded thereon adapted to generate graphics that assist in focusing a camera, the graphics indicating (i) a field of detection and a position for each of a plurality of detection zones of a distance measuring device, (ii) one or more focus settings for subject(s) and/or object(s) detected in each detection zone in a video or image, (iii) focus changes, adjustments or corrections to a lens of the camera that will bring the subject(s) and/or object(s) in detection zones that are out of the depth of field of the camera into focus, and (iv) any detection zone in which one or more subjects or objects are within the depth of field of the camera; and overlay or superimpose the graphics on a displayed video or image from the camera. The detection zones shown by the graphics that are, in turn, generated by the software generally comprise a horizontal array of detection zones, as described herein. However, the detections zones may also be displayed as a two-dimensional array of detection zones, as described herein. The field of detection and the position of each of the plurality of detection zones may be determined from the distances of the subject(s) or object(s) in the field of view of the camera. Using the known distance data and the focal length of the camera lens, the present software can simultaneously determine the focus, iris, and zoom setting changes that will bring the subject(s) and/or object(s) in detection zones that are out of focus into sharp focus, and overlay graphics indicating the direction and magnitude of such setting changes onto the video or image. The present software can also add lens setting data as overlaid text accompanying the graphics. Such text can also indicate the near and far limits of the depth of field.

CONCLUSION/SUMMARY

Thus, the present invention provides methods, apparatuses, systems and software for focusing a camera. The camera focusing system generally comprises (a) a distance measuring device, (b) a video receiver configured to receive video and/or images from the camera, (c) a graphics overlay unit, and (d) a monitor. The distance measuring device comprises an emitter configured to emit a beam of radiation, a detector configured to detect one or more reflections of the beam of radiation, and logic configured to determine and process distance information for one or more subjects or objects in each of a plurality of detection zones in a field of view of the camera from the reflections. The graphics overlay unit receives video and/or image information from the video receiver and the distance information from the distance measuring device, and comprises a video overlay and data processing unit configured to generate graphics indicating (1) a field of detection and position for each of the plurality of detection zones and (2) a direction and/or magnitude of a change or correction in focus setting(s) for the subjects or objects within each detection zone not within a depth of field of the camera (e.g., to bring a subject or object into focus). The monitor displays the video and/or images from the camera and the graphics overlaid on the displayed video and/or image.

The camera system generally comprises the present camera focusing system, a camera with a lens and a video transmitter unit that transmits a video or image signal output, a motor control and data processing unit configured to (i) adjust focus, iris, and zoom settings of the camera and (ii) transmit lens setting data to the video overlay and data processing unit, a video receiver configured to receive the video or image signal output, and a display device configured to display the video or image of the video or image signal output and the graphics overlaid on the video or image. The method of focusing generally uses the present camera focusing system to focus the camera, and comprises simultaneously determining a distance from a distance measuring device to one or more subjects and/or objects in each of a plurality of detection zones of the distance measuring device; generating graphics indicating (i) a field of detection and a position for each of the detection zones and (ii) one or more focus settings for subject(s) and/or object(s) detected in each detection zone in a video or image from the camera; indicating in the graphics focus changes, adjustments or corrections to a lens of the camera that will bring the subject(s) and/or object(s) in detection zones that are out of the depth of field of the camera into focus; and displaying the video or image on a display, and overlaying or superimposing the graphics on the displayed video or image. The software creates graphics that are useful in the present method and camera focusing system. The graphics indicate (i) the field of detection and position for each of a plurality of detection zones of the distance measuring device, (ii) one or more focus settings for subject(s) and/or object(s) detected in each detection zone, (iii) focus changes, adjustments or corrections to the camera lens that will bring the subject(s) and/or object(s) in detection zones that are out of the depth of field of the camera into focus, and (iv) any detection zone in which one or more subjects or objects are within the depth of field of the camera. The software also overlays or superimposes the graphics on a video or image from the camera displayed on a screen or monitor.

The present invention overcomes disadvantages of autofocus devices by providing a mechanism for the user to manually adjust the focus on moving subjects with high accuracy. The present invention advantageously provides a method and system for the user to accurately focus the shooting lens of a motion picture camera using graphics overlaid on the image captured by the camera. The overlaid graphics can indicate both the direction and magnitude of distances between the plane of focus of the camera lens and each of a plurality of subjects and/or objects within a plurality of detection zones in the detection field of the distance measuring device. Thus, the present invention enables motion picture and photography professionals to maintain continuously sharp images while people and things move around in real life or in moving pictures/video.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A focusing system for a video or motion picture camera, comprising:
   a. a distance measuring device, comprising:
      i. an emitter configured to emit a beam of radiation,
      ii. a detector configured to detect one or more reflections of the beam of radiation, and
      iii. logic configured to determine distance information for one or more subjects or objects in each of a plurality of detection zones in a field of view of the video or motion picture camera from the reflections;
   b. a graphics overlay unit configured to receive video information from the video or motion picture camera and the distance information from the distance measuring device, the graphics overlay unit comprising a video overlay and processing unit configured to generate graphics indicating (1) a field of detection and position for each of the plurality of detection zones and (2) a direction and a magnitude of a change in focus setting(s) for the subject(s) or object(s) within each detection zone not within a depth of field of the video or motion picture camera; and
   c. a monitor configured to display video from the video or motion picture camera and the graphics overlaid on the displayed video.

2. The focusing system of claim 1, wherein the detection zones include a two-dimensional array of the detection zones along horizontal and vertical axes across the field of view of the video or motion picture camera.

3. The focusing system of claim 1, wherein the graphics indicate the direction and the magnitude of the change in the focus setting(s) that will achieve sharp focus on at least one of the one or more subjects or objects in a selected detection zone.

4. The focusing system of claim 1, wherein the graphics indicate each detection zone containing the subject(s) or object(s) within the depth of field of the video or motion picture camera.

5. The focusing system of claim 4, wherein the graphics include a scaling that indicates the positions of the detection zones for changing a focal length and angle of view of the video or motion picture camera.

6. The focusing system of claim 4, wherein the graphics indicate a relative position of the subject(s) or object(s) within the depth of field of the video or motion picture camera.

7. The focusing system of claim 1, wherein the graphics overlay unit further comprises a communication unit configured to receive information from a motor control, data processing, and/or communication unit on the video or motion picture camera that adjusts the focus, iris, and/or zoom settings and transmits lens setting data for the video or motion picture camera.

8. The focusing system of claim 1, wherein the graphics further indicate a lens focal length, a T-stop setting, a camera type, a near depth of field distance, a far depth of field distance, and/or one or more image plane-to-subject distance measurements.

9. The focusing system of claim 1, further comprising a zoom controller, a focus knob, and an iris control slider configured to control or adjust a zoom, focus or iris setting or parameter of the video or motion picture camera.

10. The focusing system of claim 9, wherein the zoom controller comprises a joystick that controls the rate or speed with which the camera changes the focus, iris and/or zoom setting or parameter.

11. The focusing system of claim 1, further comprising a hand control unit including a display that displays menu items for calibrating the video or motion picture camera and/or controlling focus, iris and/or zoom motors of the video or motion picture camera, and a switch for selecting the menu items on the display and/or one or more input keys for selecting displayed items or functions on the display.

12. The focusing system of claim 11, further comprising a ring selector for selecting a focus distance, a witness mark that indicates the focus distance selected using the ring selector, and a focus knob.

13. The focusing system of claim 11, further comprising a set of limit selection keys configured to allow a user to select limits for the focus, iris and/or zoom motors.

14. A focusing system for a video or motion picture camera, comprising:
   a. a distance measuring device, comprising:
      i. an emitter configured to emit a beam of radiation,
      ii. a detector configured to detect one or more reflections of the beam of radiation,
      iii. logic configured to determine and process distance information for one or more subjects or objects in each of a plurality of detection zones in a field of view of a video or motion picture camera from the reflections, and
      iv. circuitry configured to automatically focus on a selected subject or object in a selected one or more of the plurality of detection zones;
   b. a graphics overlay unit configured to receive video information from the video or motion picture camera and the distance information from the distance measuring device, the graphics overlay unit comprising a video overlay and data processing unit configured to generate graphics indicating a field of detection and a position of an auto-focus detection zone, the position of the auto-focus detection zone corresponding to the selected one or more of the plurality of detection zones; and
   c. a monitor configured to display the video from the video or motion picture camera and the graphics overlaid on the displayed video.

15. The focusing system of claim 14, wherein the video overlay and data processing unit is further configured to generate graphics indicating a field of detection and position for each of the plurality of detection zones, and the graphics overlay unit is further configured to replace the graphics indicating the positions of each of the plurality of detection zones with a graphic indicating the position of the auto-focus detection zone.

16. A video or motion picture camera system, comprising:
   a. the video or motion picture camera focusing system of claim 1;
   b. the video or motion picture camera, with a lens and a video transmitter unit that transmits a video signal;
   c. a motor control unit configured to (i) adjust focus, iris, and/or zoom settings of the video or motion picture camera and (ii) transmit lens setting data to the video overlay and processing unit;
   d. a video receiver configured to receive the video signal; and
   e. a display device configured to display the video of the video signal and the graphics overlaid on the video.

17. The video or motion picture camera system of claim 16, wherein the graphics include a two-dimensional array of detection zones.

18. The video or motion picture camera system of claim 16, further comprising a data processor configured to (i) correct the distances measured by the distance measuring device for an offset from the distance measuring device to a predetermined location in an image plane of the video or motion picture camera and/or (ii) calculate the distances along an optical axis of the video or motion picture camera from the image plane to the subject(s) and/or object(s) in each of the detection zones.

19. A video or motion picture camera system, comprising:
   a. the video or motion picture camera focusing system of claim 14;
   b. the video or motion picture camera, with a lens and a video transmitter unit that transmits a video signal;
   c. a motor control unit configured to (i) adjust focus, iris, and/or zoom settings of the video or motion picture camera and (ii) transmit lens setting data to the video overlay and processing unit; and
   d. a display device configured to display the video of the video signal and the graphics overlaid on the video.

20. A non-transitory computer-readable medium, comprising a set of instructions encoded thereon adapted to:
   a. generate graphics that assist in focusing a video or motion picture camera, the graphics indicating:
      i. a field of detection and a position for each of a plurality of detection zones of a distance measuring device,
      ii. one or more focus settings for subject(s) and/or object(s) detected in each detection zone in a video, and
      iii. focus changes, adjustments or corrections to a lens of the video or motion picture camera that will bring the subject(s) and/or object(s) in detection zones that are out of the depth of field of the video or motion picture camera into focus; and
   b. overlay or superimpose the graphics on a displayed video from the video or motion picture camera.

21. The computer-readable medium of claim 20, wherein the plurality of detection zones comprises a two-dimensional array of detection zones.

22. The computer-readable medium of claim 20, the set of instructions being further adapted to replace the graphics indicating the position(s) of the detection zones with a graphic indicating an auto-focus detection zone, the position of the auto-focus detection zone corresponding to one or more of the detection zones, and to automatically focus the video or motion picture camera on a selected subject or object in the auto-focus detection zone.

* * * * *